Dec. 16, 1930.    W. STUEBING, JR    1,785,368
TRUCK
Original Filed Aug. 14, 1922    3 Sheets-Sheet 1

INVENTOR.
William Stuebing Jr.
by John W. Strebel
ATTORNEY.

Dec. 16, 1930.  W. STUEBING, JR  1,785,368
TRUCK
Original Filed Aug. 14, 1922  3 Sheets-Sheet 2
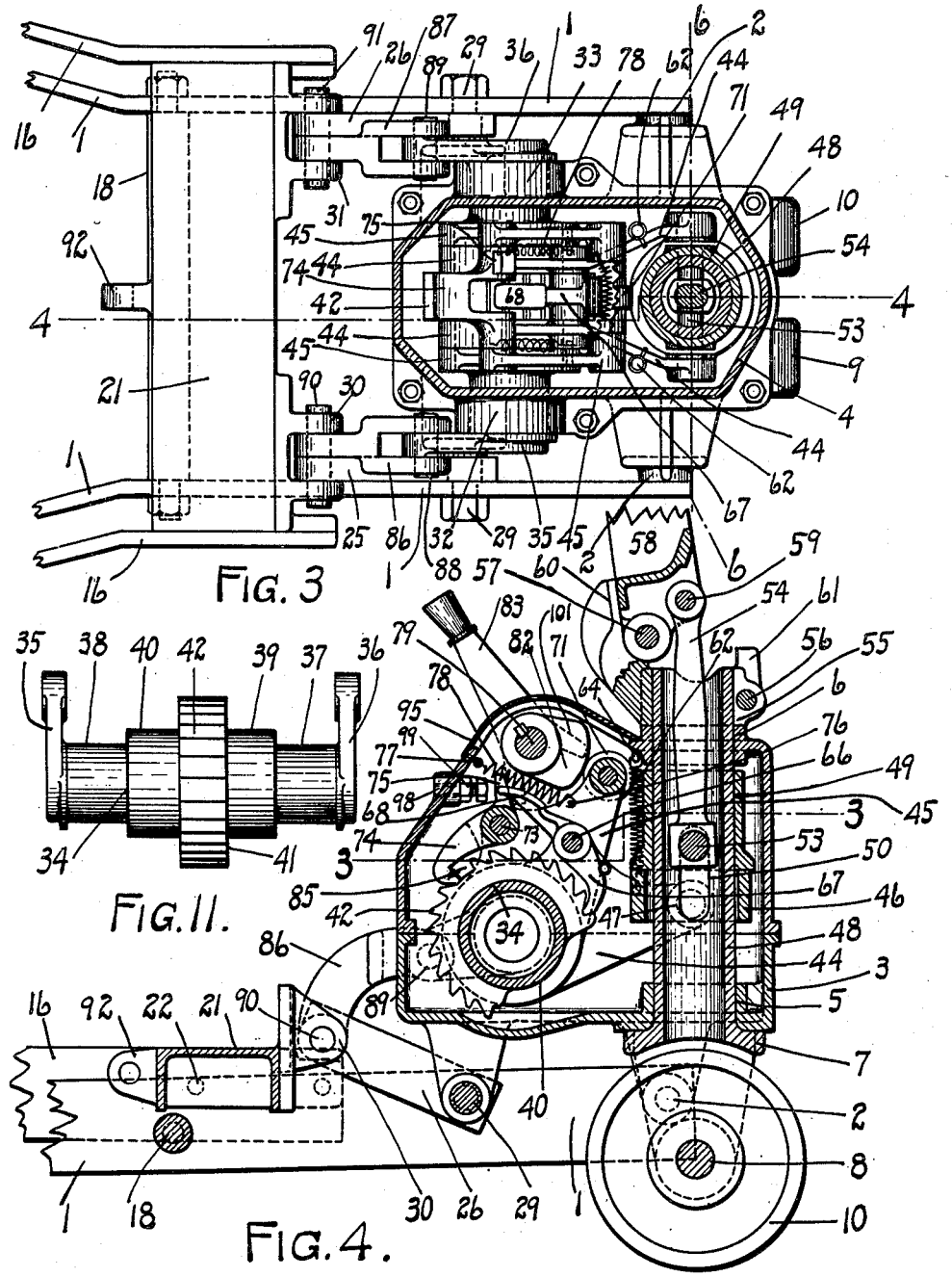
INVENTOR.
William Stuebing Jr.,
By John Strebel
ATTORNEY.

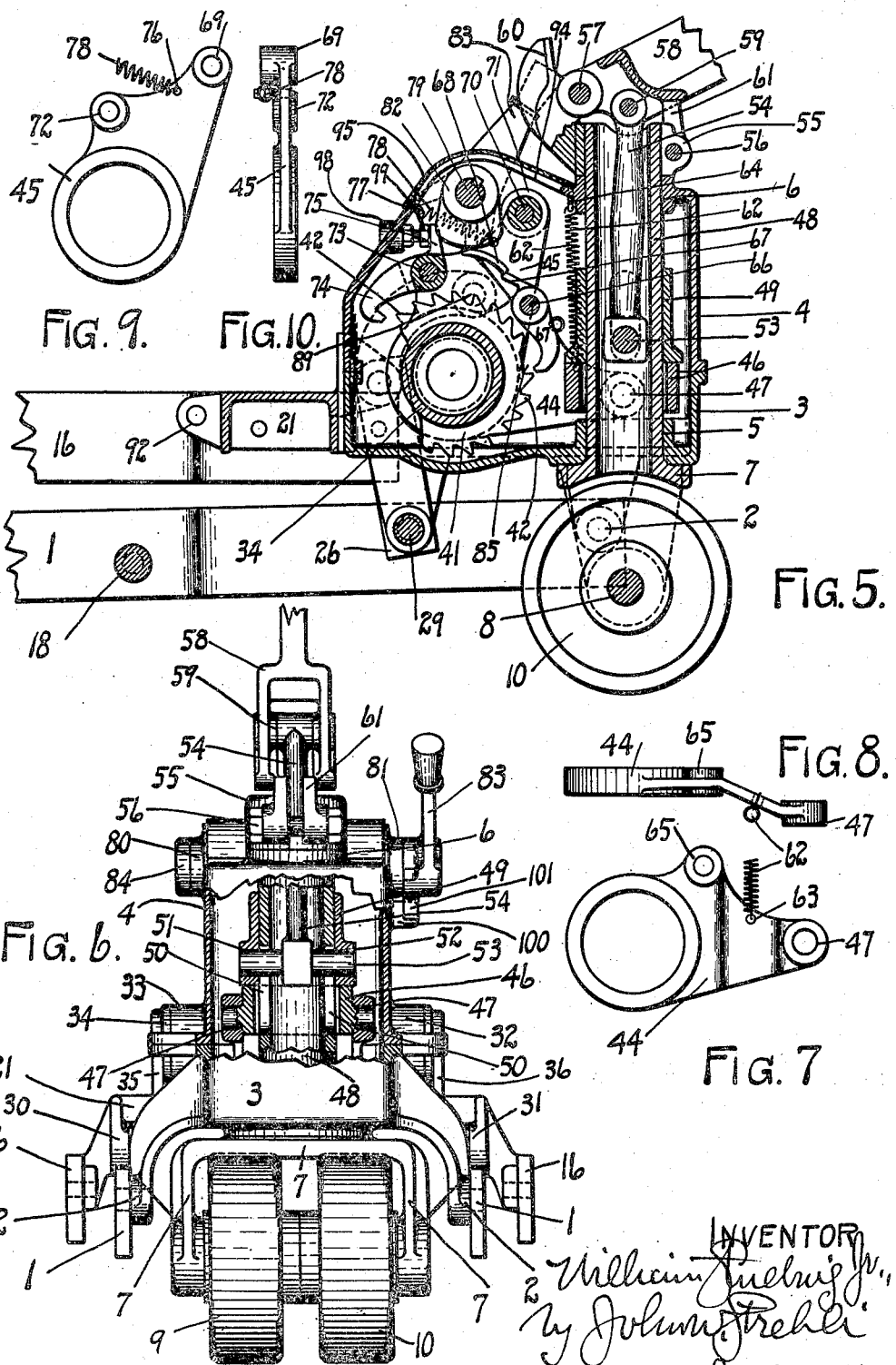

Patented Dec. 16, 1930

1,785,368

UNITED STATES PATENT OFFICE

WILLIAM STUEBING, JR., OF CINCINNATI, OHIO, ASSIGNOR, BY MESNE ASSIGNMENTS, TO THE YALE & TOWNE MANUFACTURING COMPANY, OF STAMFORD, CONNECTICUT, A CORPORATION OF CONNECTICUT

TRUCK

Application filed August 14, 1922, Serial No. 581,724. Renewed April 22, 1930.

This invention relates to lift trucks.

It is an object of the invention to provide a truck of the multiple lift type, that is, one in which the load is elevated by a series of operations of the operating member, which shall be capable of "side lift" operation, but which shall be simple in construction and reliable in operation.

It is a further object of the invention to incorporate certain safety features designed to prevent accident and injury to the operator while the truck is in use.

Other objects and advantages of the invention will appear hereinafter.

Figure 1:
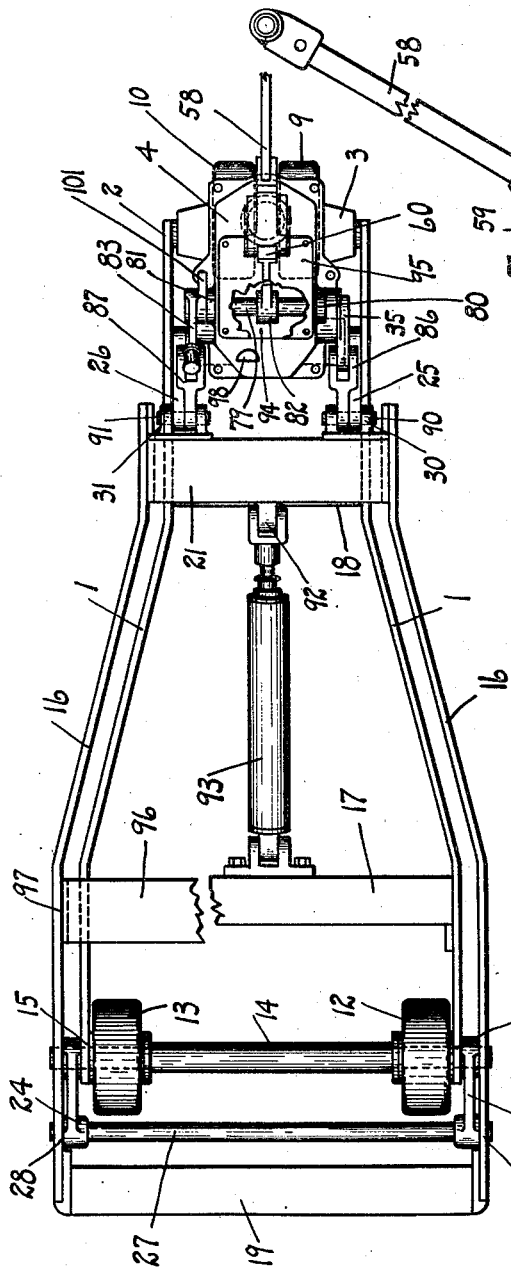
Figure 2:
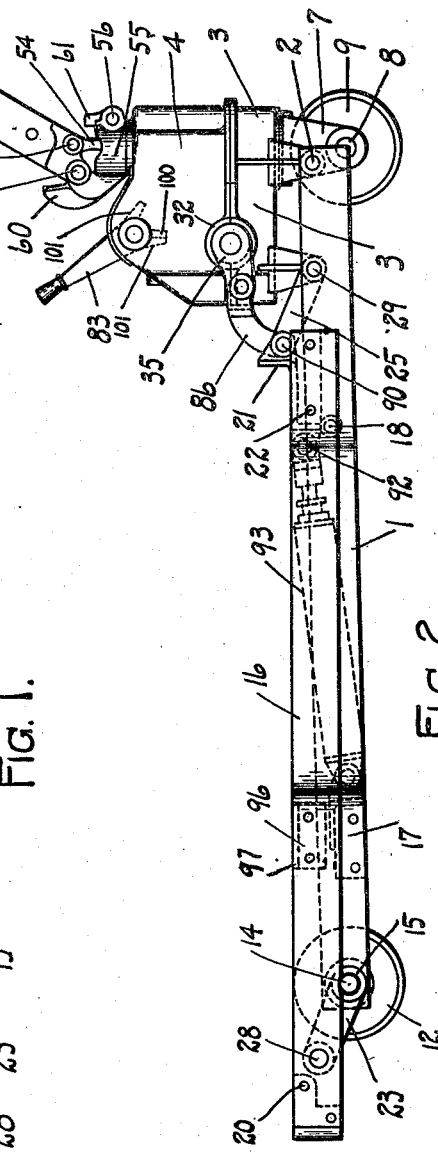

A preferred embodiment of the invention selected for purposes of illustration is shown in the accompanying drawings, in which, Fig. 1 is a plan view of a truck, with parts broken away, Fig. 2 is a side elevation of Fig. 1, Fig. 3 is an enlarged plan view, partly in section, taken on line 3—3 of Fig. 4, Fig. 4 is a side section taken on line 4—4 of Fig. 3, showing the lifting mechanism engaged and in lowest position, Fig. 5 is the same section, showing the lifting mechanism disengaged and in highest position, Fig. 6 is a front elevation with parts broken away, showing a section on line 6—6 of Fig. 3, Fig. 7 is a side elevation in detail of one lifting arm, Fig. 8 is a plan view of the same, Fig. 9 is a side elevation in detail of a holding arm, Fig. 10 is a front elevation of same, and Fig. 11 is a plan view in detail of the ratchet crank shaft.

The truck includes upper and lower frames, the latter being mounted on wheels and having two side rails 1—1. Connected to said rails 1—1 at the points 2—2, I securely fasten the lower member 3 forming the lower portion of a housing or casing for the operating parts of the lifting mechanism. This lower housing member 3 is joined by bolt and nut connections to the upper housing member 4 and forms a complete unit for holding and protecting the lifting mechanism of the truck. Referring to Figure 5, the lower housing member 3 carries a bearing 5, and the upper housing member 4 carries a bearing 6. Mounted in bearings 5 and 6, I journal and swivel the fork 7. At the lower end of fork 7 on the shaft 8, I mount the two front wheels 9 and 10. At the rear end of the lower frame 1, I mount the rear wheels 12 and 13 on shaft 14 which is journaled at the points 15—15 in the lower rails 1—1. The lower frame is securely fastened together at the rear by the tie bar 17 and is also held firmly together by tie rod 18 which is placed at a point between the tie bar 17 and the front end of the truck. This construction completes the lower frame of the truck, mounted on wheels, with swivelled wheels at the front for steering movement.

The upper frame of the truck is mounted on links for elevating movement. This frame or elevating platform is constructed with two side rails 16—16 fastened together at the rear by tie bar 19 securely fastened by screws 20. The front end of the upper frame is held firmly together by saddle 21 fastened to side rails 16—16, by screws 22. A similarly rearwardly positioned tie bar 96 is also used to hold the upper frame together at points 97. The upper frame is mounted to be elevated from the lower frame by means of the rear links 23 and 24 and the front links 25 and 26. The rear links 23 and 24, at their lower ends, are journaled at each end of the lower shaft 14 and to the outside of lower rails 1—1. The upper ends of rear links 23 and 24 are journaled on shaft 27. This shaft 27 extends across the width of the truck, through the links 23 and 24 and is journaled in the side rails 16—16, at points 28. The front links 25 and 26 are journaled at their lower ends on shaft 29. This shaft 29 extends across, and is secured in the lower frame, and is also used for supporting housing member 3. The upper ends of links 25 and 26 are journaled in bearings 30 and 31 of the saddle 21.

The lower housing member 3 and the housing member section 4, when fastened together form bearings 32 and 33. Half of these bearings are part of lower housing member 3 and the other half are part of housing member 4. Journaled in said bearings, I place ratchet crank shaft 34. (See Figures 3, 4 and 11.) This shaft 34 is a complete unit and has side arms 35 and 36, which are integral therewith. The bearing surfaces 37 and 38 journal in bearings 32 and 33, and bearing surfaces 39 and 40 carry the pairs of lifting arms 44—44 and holding arms 45—45. (See Figures 3, 4, 7, 8, 9 and 10.) Centrally of the crank shaft 34 is a ratchet 41 having a multiplicity of teeth 42. As shown in Figures 4 and 5 the arms 44—44 extend forward and connect to a trunnion collar 46 at points 47. The steering fork 7, which is mounted in lower housing member 3 and upper housing member 4, has a hollow spindle 48. The trunnion collar 46 is made to operate around this spindle. Above the collar 46, a sleeve 49 operates directly on trunnion collar 46 and has a sliding movement on spindle 48. Cut vertically in spindle 48, I provide slots 50. As shown in Figures 4, 5 and 6, journaled in sleeve 49, at points 51 and 52, I place a shaft 53. This shaft 53 extends through slots 50 of the spindle 48. Inside of the spindle 48 and connected to shaft 53, I pivotally mount the lower end of link 54. At the upper end of spindle 48, I securely fasten the collar 55 by a draw bolt 56. This collar 55 has a bearing 57 on which is pivotally mounted a handle 58. The upper end of link 54 is pivotally connected to steering tongue 58, at point 59. Collar 55 carries an extension 60, which limits the pivotal movement of steering tongue 58 in one direction, and also an extension 61, integral with collar 55 which limits the pivotal movement of handle 58 in the other direction. Fastened to arms 44—44 at points 63 (see Fig. 7) are springs 62 which extend vertically for connection to the upper housing member 4 at points 64. These springs urge the trunnion collar upwardly, together with its connections as described, any have a tendency to hold the steering tongue in its raised position. The arms 44—44 have bearings 65, carrying the shaft 66. Pivotally mounted on shaft 66 is a pawl 67 which operates on the teeth 42 of the ratchet 41, and has a rearwardly extending arm 68. Also mounted on ratchet crank shaft 34, at the bearing surfaces 39 and 40, and adjacent to arms 44—44, I place the pair of arms 45—45. These arms 45—45 at their upper extremity have bearings 69 in which I place shaft 70. On this shaft 70, and between arms 45—45, I mount a roller 71. On arms 45—45, I provide bearings 72, carrying a shaft 73, on which shaft is pivotally mounted a holding pawl 74, having an upwardly extending arm 75. Adjacent the arm 75, on the upper housing member 4 at bearing 98, I provide an adjusting screw 99, which is in line, and comes in contact with, extending arm 75 of the pawl 74. The purpose of this construction is to release the holding pawl when the holding mechanism is tripped. Coil springs 78 are connected to the arms 45—45 at points 76 and are also connected to the upper housing member at points 77. In upper housing member 4 I place cam shaft 79 journaled in bearings 80 and 81. On cam shaft 79 I securely fasten cam 82. The roller 71 is held in position against the surface of the cam 82, by means of the pair of springs 78. One end of the shaft 79 extends beyond the bearing 81 of the housing member 4, and has secured to it the lever 83. On upper housing member 4, below bearing 81, as best shown in Figures 2 and 6, I have an extending lug 100, and on the lower end of lever 83, I also have downwardly extending lugs 101. These lugs 101 limit the pivotal movement of the cam shaft 79 when they come in contact with lug 100 of the upper housing member. On the opposite end of shaft 79 is a collar 84 which holds the shaft in place. At a point 85 on ratchet 41, I purposely omit one tooth, thus making the pawl 67 inoperable at this point. Connected to the arms 35 and 36, respectively, by means of pins 88 and 89 are the links 86 and 87 which are also connected by means of pins 90 and 91 to the bearings 30 and 31, and, as will be observed, rotary motion of the shaft 34 will be communicated through arms 35 and 36 and through links 86 and 87 to induce upward and forward movement of the elevating frame. Between the rearward extending lug 92 of the saddle 21 of the elevating frame and tie bar 17, on the lower frame, I place the check or cushioning device 93 of any suitable construction. In the upper part of housing member 4, I provide hand hole 94 and cover 95, in order to have access to working parts and refilling with grease.

In operation the parts are ordinarily in such position that the platform is lowered and the pawls 67 and 74 are out of engagement with the ratchet teeth 42. When it is desired to use the truck, the truck is placed beneath the load to be lifted, and then the handle 83 is manually operated so that the cam 82 moves out of engagement with and releases the tail 68 of the pawl 67 and allows said pawl to move into engagement with the teeth 42 of the ratchet wheel. At the same time, the cam 82 pushes the roller 71 forwardly so that the arms 45 are swung in a clockwise direction. This causes the tail 75 of the pawl 74 to disengage the stop 99. Then the parts are in the position shown in Figure 4, and if the steering tongue 58 is swung forwardly about the pivot 57, the link 54 will cause the collar 46 to move downwardly and move the arms 44 in a clockwise direction. As said arms carry the pawl 67, it will be understood that said pawl will move the ratchet wheel 41 also in a clockwise direction, and at this time the pawl 74 rides over the teeth 42 of the ratchet wheel. As the ratchet wheel moves in a clockwise direction, the arms 35 and 36 which are rigidly connected to the ratchet wheel shaft, will also turn in a clockwise direction and thus cause the links 86 and the platform to rise slightly and move forward. When the handle 58 has been moved downwardly sufficiently to engage the stop 61, said handle may be again raised. During the elevation of the handle, the link 54 will rise and the springs 62 will raise the arms 44 and the collar 46, so that the pawl 67 will move in a counter-clockwise direction and ride over the teeth 42 of the ratchet wheel. During this movement the pawl 74 is in holding engagement with the ratchet teeth 42 and prevents counter-clockwise movement of said ratchet wheel.

The before mentioned operations are repeated a sufficient number of times until the platform is elevated to the desired position, and then the truck may be moved on its wheels 9, 10, 12 and 13 to carry the load wherever desired.

When it is desired to lower the platform and the load, the handle 83 is swung in a clockwise direction and this causes the cam 82 to engage the tail 68 to cause the pawl 67 to move out of engagement with the teeth 42, and subsequently as the handle 83 is swung still further in a clockwise direction the cam 82 is caused to release the roller 71, so that the load weight and the spring 78 swing the arms 45 in a counter-clockwise direction bringing the tail 75 of the pawl 74 into engagement with the stop 99. When the tail 75 engages the stop, the pawl 74 is swung in a clockwise direction so that it releases the ratchet teeth 42. When the pawls are thus released the platform may descend, checked only by the check 93.

From the foregoing it will be understood that the handle 83 operates a single cam 82 which performs a dual function, that is, said cam is the sole instrumentality for releasing both the lifting pawl 67 and the locking pawl 74.

Furthermore the construction is such that the lifting mechanism may be operated regardless of the lateral position of the steering tongue 58. In other words, the steering tongue 58 may be operated to lift the elevating frame whether the tongue is pointed forwardly or to one side of the truck.

It is believed that the foregoing description will enable those skilled in the art to make use of the invention without further explanation, and it is apparent that changes may be made in the details disclosed without departing from the spirit of the invention as expressed in the claims.

What I claim as new and my invention and desire to secure by Letters Patent is:—

1. A lifting truck including a wheel supported frame, an elevating platform carried by said frame, a steering handle for said frame, means actuated by said handle for raising said platform and including an operating member, locking means for the platform including a pawl-carrying member, a pawl pivoted thereto, and a control member engageable with and disengageable from the operating member and pawl-carrying member to effect disengagement of the operating member and the pawl.

2. A lifting truck including a wheel supported carriage, an elevating platform carried by the carriage, a steering handle for the carriage, platform elevating means actuated by the handle and including a ratchet wheel and pawl, a locking pawl engageable with said ratchet wheel, a supporting member for the locking pawl, a control member, and means connected to the control member and engageable with and disengageable from the supporting member and the first mentioned pawl for controlling the engagement of said pawls with said ratchet wheel.

3. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a sleeve surrounding the post and rotatable with said post, said post being slotted, a pin fixed to said link, extending through the slots of the post and engaging said sleeve, and means for raising said sleeve on the post.

4. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a sleeve slidably mounted on the post, rotatable with the latter and connected to said link, and means including a spring for raising said sleeve.

5. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a member slidably mounted on said post and connected to said link, a collar rotatably mounted on the post and abutting against said slidably mounted member, a ratchet wheel, a pawl engagable with the ratchet wheel, and an oscillating arm carrying the pawl and connected to said collar.

6. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft carrying a ratchet wheel, arms pivotally mounted on said rock shaft, a pawl carried by the arms and engageable with the teeth of the ratchet wheel, and means connecting said arms to said link.

7. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided at its central portion with a ratchet wheel and provided on the opposite sides of said ratchet wheel with cylindrical bosses, arms pivotally mounted on said bosses and operatively connected to said link, and a pawl carried by the arms and engageable with said ratchet wheel.

8. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided with a ratchet wheel, arms pivotally mounted on said shaft and operatively connected to said link, a pawl mounted on the arms and engageable with the ratchet wheel for rotating the latter, other arms rotatably mounted on the rock shaft, and a locking pawl carried by the last mentioned arms and engageable with the teeth of the ratchet wheel for securing the latter against rotation in one direction.

9. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided with a ratchet wheel, arms pivotally mounted on said rock shaft and operatively connected to said link, a spring for urging said arms in one direction, and a pawl carried by said arms and engageable with the teeth of the ratchet wheel for rotating the latter in one direction.

10. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided with a ratchet wheel, arms pivotally mounted on said rock shaft on opposite sides of said ratchet wheel, a pin connecting said arms, a pawl mounted on said pin and engageable with the teeth of said ratchet wheel for rotating the latter in one direction, and means operatively connecting said arms to said link.

11. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided with a ratchet wheel, arms pivotally mounted on said shaft on opposite sides of said ratchet wheel, a pawl mounted on said arms and engageable with the teeth of said ratchet wheel for rotating the latter in one direction, means operatively connecting said arms to said link, and a spring for moving said arms in one direction.

12. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided at its ends with integrally connected parallel arms adapted to be connected to said platform, a ratchet wheel integral with the rock shaft, arms pivotally mounted on the rock shaft, a pawl carried by said pivotally mounted arms and engageable with the teeth of the ratchet wheel for rotating the latter in one direction, and means operatively connecting said pivotally mounted arms to said link.

13. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a rock shaft provided at its ends with fixed arms, a ratchet wheel fixed to the shaft intermediate its ends, arms pivotally mounted on said shaft and arranged on opposite sides of said ratchet wheel, a pawl carried by said pivotally mounted arms and engageable with the teeth of said ratchet wheel, and means operatively connecting said pivoted arms with said link.

14. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, and means for locking said platform elevating means in various positions.

15. A lifting truck including a wheel supported carriage having a hollow steering post, an elevating platform carried by the carriage, a steering tongue pivotally connected to said post, a link connected to the tongue and extending into the post, and pawl and ratchet platform raising mechanism connected to be actuated by said link, including a ratchet wheel, and locking means associated with said platform elevating means and comprising a pawl engageable with the teeth of said ratchet wheel, a pivotally mounted arm carrying said pawl, a stop engageable with said pawl for moving the same out of engagement with the teeth of said ratchet wheel, and means for moving said arm in one direction to disengage said pawl from said stop and to permit the pawl to engage the teeth of the ratchet wheel.

16. A lifting truck including a wheel supported carriage having a steering tongue, an elevating platform carried by the carriage, a ratchet wheel operatively connected to said platform and adapted when rotated in one direction to cause elevation of the platform, means operatively connecting said ratchet wheel to said tongue and constructed to permit actuation of the ratchet wheel by the tongue, a pivotally mounted arm, a locking pawl carried by said arm and engageable with the teeth of the ratchet wheel for locking the latter against reverse rotation, a stop engageable with said pawl for moving the same out of engagement with the teeth of the ratchet wheel, an oscillating cam engageable with said arm for moving the same in a direction to disengage the pawl from said stop, means for moving said arm in an opposite direction, and a control member for said cam.

17. A lifting truck as claimed in claim 16 including means for adjusting said stop.

18. A lifting truck as claimed in claim 16 in which the means for moving said arm in one direction includes a spring.

19. A lifting truck as claimed in claim 16 including a roller connected to the arm and engaged by the cam, and a rock shaft connecting said cam and said control member.

20. A lifting truck including a wheel supported carriage having a hollow steering post, a steering tongue pivotally connected to said post, a link pivotally connected to said steering tongue and extending in the same general direction as the axis of said post, a lifting platform carried by said carriage, a rock shaft operatively connected to said platform and adapted to elevate the latter when the rock shaft is moved in one direction, a ratchet wheel mounted on said rock shaft, a pivotally mounted arm, a pawl carried by said arm and engageable with the teeth of said ratchet wheel, means operatively connecting said arm to said link, and means spaced from said post for locking said ratchet wheel against reverse rotation.

21. A lifting truck including a wheel supported carriage provided at its forward end with a closed casing, a hollow steering post extending through said casing, a steering tongue pivotally mounted at the upper end of said post, a link pivotally connected to said tongue and extending into said post, an elevating platform carried by said carriage, and platform elevating means operatively connected to said platform and link and having the major portion of its mechanism arranged within said casing.

22. A lifting platform as claimed in claim 21 in which said platform elevating means includes a sleeve slidably mounted on and rotatable with said post, means connecting said sleeve to said link, a collar rotatably mounted on the post and bearing against the sleeve, and resilient means for raising said collar.

23. A lifting truck as claimed in claim 21 in which the platform elevating means includes a sleeve slidable relatively to said post and rotatable with the latter, means connecting said sleeve to said link, a collar slidable on and rotatable relatively to said post and bearing against the sleeve, and means for raising said collar relatively to said post.

24. A lifting truck including a wheel supported carriage, a casing arranged at one end of said carriage, a hollow steering post extending through said casing and provided with elongated slots, a steering tongue pivotally mounted on said post above said casing, a link pivotally connected to said tongue and extending into said post, a pin connected to said link and extending through said slots, a sleeve connected to said pin, a second collar abutting against the sleeve, a rock shaft provided with a ratchet wheel, arms pivotally mounted on said rock shaft and pivotally connected to said collar, a pawl carried by said arms and engageable with the teeth of the ratchet wheel, an elevating platform carried by the carriage, and means connecting said platform to said rock shaft, whereby the rotation of the latter will cause elevation of the platform.

25. A lifting truck including a wheel supported carriage, an elevating platform carried by said carriage, a steering handle for the carriage, platform elevating means actuated by the handle and including a ratchet wheel and pawl, said ratchet wheel having two sets of teeth separated by a notch, a locking pawl engageable with said ratchet wheel and adapted to rest in said notch when the platform is in its lowest position, a supporting member for the locking pawl, a control member, and means connected to the control member and engageable with the supporting member and the first mentioned pawl for controlling the engagement of said pawls with said ratchet wheel.

26. A lifting truck including a wheel supported frame provided at its front end with an oil box, a steering post for the truck extending through said box, a steering handle connected to the post and arranged above said box, and means connected to the handle and platform substantially all of which is located in said box, for raising the platform when the handle is actuated.

27. A lifting truck comprising a wheeled frame having a swivelled steering head with a pivoted steering handle, an elevating platform mounted on the wheeled frame, means operated by the steering handle for elevating the platform, a check device for retarding the lowering of the platform, the elevating means comprising a ratchet, a member slidably associated with the swivelled steering head, and a pawl operated by the slidable member to actuate the ratchet step by step upon successive movements of the steering handle.

28. A lifting truck as defined in claim 27 wherein the means for elevating the platform includes an oscillatory member on which the pawl is pivotally mounted and in which the members slidably associated with the swivelled head comprises a collar slidable on the steering post and spring means for returning said collar.

29. A lifting truck, as defined in claim 27 characterized by the provision of a locking pawl engageable with the ratchet to hold the platform in elevated position, a movable support for said pawl, and releasing means to permit movement of the movable support.

30. A lifting truck, as defined in claim 27, having a locking means comprising a pawl engageable with the ratchet, a pivotally mounted arm carrying said pawl, a stop engageable with said pawl upon movement of the arm for moving the pawl out of engagement with the ratchet, and means for moving the arm to disengage the pawl from said stop.

31. A lifting truck comprising a wheeled frame, an elevating frame, means for holding the elevating frame in elevated position comprising a pawl and a movable member on which said pawl is carried, a ratchet engageable by said pawl, said movable member being mounted to permit said pawl to move in the direction of movement of said ratchet while still in operative engagement therewith, and means for effecting disengagement of said pawl and ratchet.

32. A lifting truck comprising a wheeled frame, an elevating frame carried thereby, a fluid check between said frames, interengaging members for holding said frame in elevated position, and means for moving one of said members to permit a partial descent of the elevating frame under control of said check prior to disconnection of said holding members.

33. A lifting truck comprising a main frame, an elevating frame, means for holding the elevating frame in elevated position comprising a pawl and a movable member on which said pawl is pivoted, a ratchet engageable by said pawl, means permitting said movable member and said pawl to move with said ratchet, and means acting thereafter to disengage said pawl from said ratchet.

34. A hand truck comprising in combination an elevating platform, steering wheels, and a steering post therefor, a manually operable lever hinged to the top of said post, a vertically movable plunger and a separate collar each slidable upon said post, means for connecting said collar to said platform, and means whereby said lever may at times depress said plunger and collar, substantially as and for the purpose specified.

35. A lifting truck comprising an elevating frame, means for raising said elevating frame relative to other portions of the truck, means for holding said elevating frame in elevated position, and means for releasing the hold of said holding means including manually operable means to permit initial downward movement of said frame, and means operative during said initial downward movement to free said frame for further downward movement.

36. A lifting truck comprising an elevating frame, wheels for supporting said elevating frame, means for raising said elevating frame relative to said wheels, means for holding said elevating frame in elevated position, means actuated by the load weight of the elevating frame for releasing said holding means, and means to free the load weight for such actuation.

37. A lifting truck comprising an elevating frame, means mounting said elevating frame for upward movement relative to other portions of the truck, and means for holding said elevating frame in elevated position, for releasing and for locking the same against release, including a latch device having a holding portion and a portion adapted by the application of pressure thereto to move the holding portion of said latch device out of holding position, and a manually operable member pivoted to be swung in a substantially vertical plane and having operatively connected therewith and arranged to be moved thereby a control member shaped and positioned to prevent releasing movement of said latch device when said first-named member is inclined to one side of its upright position but to permit releasing movement when said member is moved to substantially upright position.

38. A lifting truck comprising an elevating frame, means mounting said elevating frame for upward movement relative to other portions of the truck, and means for holding said elevating frame in elevated position, for releasing and for locking the same against release, including a latch device having a holding portion and a portion adapted by the application of pressure thereto to move the holding portion of said latch out of holding position, and a manually operable member pivoted upon the truck and having operatively connected therewith a stop member, a latch controlling member pivoted upon the truck operatively between said latch device and said stop member and so positioned that a portion thereof may swing into contact with said stop member when the latter is in certain positions and prevent the release of the latch device, said stop member being so shaped and positioned relative to parts cooperative therewith that when said manually operable member occupies a certain position said latch controlling member may move without interference by said stop member to free the latch to be released.

39. A lifting truck comprising an elevating frame, means mounting said elevating frame for upward movement relative to other portions of the truck, and means for holding said elevating frame in elevated position, for releasing and for locking the same against release, including a latch device, a manually operable member pivoted upon the truck and having operatively connected therewith a stop member, a latch controlling member pivoted upon the truck operatively between said latch device and said stop member and so positioned that a portion thereof may swing into contact with said stop member when the latter is in certain positions and prevent the release of the latch device, said stop member being so shaped and positioned relative to parts cooperative therewith that when said manually operable member occupies a certain position said latch controlling member may move without interference by said stop member to free the latch to be released.

40. A lifting truck comprising an elevating frame, means mounting said elevating frame for upward movement relative to other portions of the truck, and means for holding said elevating frame in elevated position, for releasing and for locking the same against release, including a reciprocable member operative in accordance with its position respectively to permit or prevent releasing action, and a manually operable member pivoted upon the truck operatively associated with a control member movable by said manually operable member into positions respectively to prevent or permit operative motion of said reciprocable member, so as to govern the releasing action of said holding means in accordance with the position of said manually operable member.

In testimony whereof I affix my signature at Cincinnati, Ohio, this 9th day of August, 1922.

WILLIAM STUEBING, Jr.

CERTIFICATE OF CORRECTION.

Patent No. 1,785,368.　　　　　　　　　Granted December 16, 1930, to

WILLIAM STUEBING, JR.

It is hereby certified that error appears in the printed specification of the above numbered patent requiring correction as follows: Page 1, line 76, for the word "similarly" read similar; line 96, before the word "housing" second occurrence, insert the word upper, and line 97, strike out the word "section"; page 2, line 43, for the word "any" read and; and that the said Letters Patent should be read with these corrections therein that the same may conform to the record of the case in the Patent Office.

Signed and sealed this 17th day of February, A. D. 1931.

(Seal)　　　　　　　　　　　　　　　　　　　M. J. Moore,
　　　　　　　　　　　　　　　　　　　Acting Commissioner of Patents.